(12) United States Patent  (10) Patent No.: US 8,764,296 B2
Omori                      (45) Date of Patent:     Jul. 1, 2014

(54) SPIRAL-GROOVED THRUST BEARING (75) Inventor: Naomichi Omori, Ichikawa (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 13/824,025

(22) PCT Filed: Oct. 19, 2011

(86) PCT No.: PCT/JP2011/074011
§ 371 (c)(1),
(2), (4) Date: Apr. 12, 2013

(87) PCT Pub. No.: WO2012/056961
PCT Pub. Date: May 3, 2012

(65) Prior Publication Data
US 2013/0195631 A1    Aug. 1, 2013

(30) Foreign Application Priority Data
Oct. 26, 2010   (JP) ................................. 2010-239908

(51) Int. Cl.
*F16C 32/06*   (2006.01)

(52) U.S. Cl.
USPC ........................................................ 384/123

(58) Field of Classification Search
USPC .................................. 384/107, 112, 121, 123
See application file for complete search history.

(56) References Cited

U.S. PATENT DOCUMENTS 3,376,083 A *   4/1968  Muijderman ................. 384/123
7,290,934 B2 * 11/2007  Nishimura et al. ........... 384/107
7,579,621 B2 *  8/2009  Kim et al. ....................... 257/43

FOREIGN PATENT DOCUMENTS

| JP | 44-022322 | 9/1969 |
| JP | 51-014557 | 2/1976 |
| JP | 61-167714 | 7/1986 |
| JP | 5-225687 | 9/1993 |
| JP | 6-117432 | 4/1994 |
| JP | 2008-038989 | 2/2008 |
| WO | WO 2009/145159 | 12/2009 |

OTHER PUBLICATIONS

International Search Report and Written Opinion mailed Jan. 17, 2012 in corresponding PCT International Application No. PCT/JP2011/074011.

* cited by examiner

*Primary Examiner* — Phillip A Johnson
(74) *Attorney, Agent, or Firm* — Ostrolenk Faber LLP (57) ABSTRACT

A thrust-bearing (1) disposed to face a thrust collar provided on a rotary shaft, including: grooves (5) formed at a bearing-surface (4*b*); a first-groove-group (6A) constituted by a plurality of first-spiral-grooves (6) formed at an inner circumferential side of the bearing-surface (4*b*); a second-groove-group (7A) constituted by a plurality of second-spiral-grooves (7) formed at an outer circumferential side more than the first-groove-group (6A) and wound in the same direction as the first-spiral-groove (6); and an annular-land-section (8) formed at the side, to which a fluid is drawn, among the inner circumferential more than the first-groove-group (6A) and the outer circumferential more than the second-groove-group (7A), wherein some of the first-spiral-grooves (6) of the first-groove-group (6A) and some of the second-spiral-grooves (7) of the second-groove-group (7A) are in communication with each other via a partial-communication-section (11), at least one side of which is in partial communication with the other side.

4 Claims, 6 Drawing Sheets

SPIRAL-GROOVED THRUST BEARING

CROSS-REFERENCE TO RELATED APPLICATIONS

The present application is a 35 U.S.C. §§371 national phase conversion of PCT/JP2011/074011, filed Oct. 19, 2011, which claims priority of Japanese Patent Application No. 2010-239908, filed Oct. 26, 2010, the contents of which are incorporated herein by reference. The PCT International Application was published in the Japanese language.

TECHNICAL FIELD

The present invention relates to a thrust bearing.

BACKGROUND ART

In the related art, a thrust bearing disposed opposite to a thrust collar installed at a rotary shaft is well known as a bearing for a high speed rotor. Among thrust bearings, for example, a thrust dynamic pressure bearing using a dynamic pressure effect has a spiral groove formed at a bearing surface of the bearing, and as a fluid lubricating film is formed between the thrust collar and the bearing surface, the rotary shaft is supported via the lubricating film.

A pump-in type (the structure type), a pump-out type, and a herringbone type are well known as spiral grooves of the thrust bearing, which are formed in the bearing surface of the thrust dynamic pressure bearing. In the spiral groove, for example, in the pump-in type or pump-out type, a plurality of spiral grooves (spiral-shaped grooves) are formed at the same pitch. All of the spiral grooves are formed to have the same inflow angle. One end of the spiral groove is closed by a land section in the innermost circumference or the outermost circumference of the bearing surface, and the other end is opened.

A type (a structure type) in which the land section is formed at the innermost circumference is referred to as the pump-in type, and a type in which the land section is formed at the outermost circumference is referred to as the pump-out type. When these are assembled to the thrust collar, which is rapidly rotated, a lubricating fluid sandwiched between the thrust collar and the bearing by rotation of the thrust collar is pulled to the thrust collar through viscosity thereof. As a result, the lubricating fluid flows along the groove. For example, in the case of the pump-in type, the lubricating fluid is drawn at the outermost circumference of the bearing surface. The drawn lubricating fluid is introduced (drawn) to the innermost circumferential side from the outermost circumference of the bearing along the groove. After that, the lubricating fluid runs on the innermost circumference land section at the closing end of the groove. Here, as a flow path is abruptly narrowed, a pressure (a film pressure) of the fluid lubricating film is increased.

As a result, the film pressure of the fluid lubricating film of the pump-in type becomes a mountain-shaped distribution in which a peak is formed at a boundary section (the closing end of the groove) between the innermost circumference land section and the groove. Similarly, the film pressure of fluid lubricating film of the pump-out type becomes a mountain-shaped distribution in which a peak is formed at a boundary section (the closing end of the groove) between the outermost circumference land section and the groove. In reality, all the lubricating fluid does not flow in the groove. Some of the lubricating fluid flows in a circumferential direction and runs on a spiral-shaped land section formed between groove rows.

For this reason, in the pump-in type, the film pressure is also generated between the spiral groove of the outer circumferential side and the land section (between the groove closer to the outer circumferential and the land section). In the pump-out type, the film pressure is also generated between the spiral groove of the inner circumferential side and the land section (between the groove closer to the inner circumferential and the land section).

In addition to the pump-in type or the pump-out type, a bearing having a spiral groove in which the herringbone type, pump-in type, and pump-out type are assembled is well known (for example, see Patent Document 1 and Patent Document 2).

PRIOR ART

Patent Document

[Patent Document 1]: Published Japanese Translation No. 2008-38989 of the PCT International Publication
[Patent Document 2]: Japanese Unexamined Patent Application, First Publication No. H05-225687

SUMMARY OF THE INVENTION

Problems to be Solved by the Invention

In the conventional pump-in type or pump-out type, as described above, an area in the pressure (film pressure) distribution of a fluid lubricating film in which the film pressure is increased is concentrated around the closing end of the groove. That is, the peak of the film pressure is formed around the closing end of the groove. However, while the fluid lubricating film forms the peak pressure based on the calculation, the actual peak pressure deviates from a theoretical value by a surface roughness of the bearing surface. When the theoretical peak pressure is not obtained in the peak pressure generating area, if a large load is applied by a disturbance or the like, in the peak pressure generating area, the fluid lubricating film is likely to be broken. When the fluid lubricating film is broken, a contact between the bearing surface and the thrust collar occurs, and thus burning may occur.

In the bearing disclosed in Patent Document 1, the spiral groove is communicated from the open end to the closing end, and a direction of the spiral groove is reversed at the inner circumferential side and the outer circumferential side. However, the area in the pressure (film pressure) distribution of the fluid lubricating film in which the film pressure is increased is concentrated around the closing end of the groove, like the above-mentioned conventional pump-in type or the like. Accordingly, in the bearing disclosed in Patent Document 1, as described above, a problem related to easy breakage of the fluid lubricating film in the area in which the film pressure is increased cannot be solved.

In the bearing disclosed in Patent Document 2, an annular land is formed in the middle of the spiral groove, and the spiral groove is divided into two parts at the inner circumferential side and the outer circumferential side. However, when the spiral groove is divided into two parts at the inner circumferential side and the outer circumferential side by the land, the area in the pressure (film pressure) distribution of the fluid lubricating film in which the film pressure is increased is concentrated around the land (in the closing end of the spiral groove of the outer circumferential side) configured to divide the groove into two parts. Accordingly, even in the bearing disclosed in Patent Document 2, as described above, a problem related to easy breakage of the fluid lubricating film in the area in which the film pressure is increased cannot be solved.

In consideration of the above-mentioned circumstances, it is an aspect of the present invention to provide a thrust bearing in which a fluid lubricating film cannot be easily broken even in an area in which a film pressure is increased, and a contact between a bearing surface and a thrust collar cannot easily occur to suppress burning thereof.

Means for Solving the Problems

In a thrust bearing of the present invention disposed to oppose a thrust collar installed at a rotary shaft, a groove section is formed at a bearing surface disposed to oppose the thrust collar; the groove section has at least a first groove group constituted by a plurality of first spiral grooves formed at an inner circumferential side of the bearing surface, and a second groove group formed at an outer circumferential side of the bearing surface more than the first groove group and constituted by a plurality of second spiral grooves wound in the same direction as the first spiral grooves; an annular land section is formed at the side to which a fluid is drawn, among the inner circumferential side more than the first groove group and the outer circumferential side more than the second groove group; and some of the first spiral grooves of the first groove group and some of the second spiral grooves of the second groove group continued via a partial communication section, at least one side of which is in partial communication with the other side.

According to the thrust bearing, some of the first spiral grooves of the first groove group and some of the second spiral grooves of the second groove group are in communication with each other via the partial communication section. Accordingly, for example, when the structure is applied to a pump-in type, a portion of the lubricating fluid flowing along some of the second spiral grooves of the second groove group of the outer circumferential side is blocked at the partial communication section, and thus a high film pressure is generated at the partial communication section. In addition, the remaining portion passes through the first spiral grooves of the first groove group of the inner circumferential side and arrives at the land section formed at the inner circumferential side more than the first groove group, which becomes a side to which the lubricating fluid is drawn, generating a high film pressure even at this place. Further, a branch flow separated from a main flow along the spiral grooves becomes a flow in a circumferential direction and runs on the land between the spiral grooves, generating a film pressure. As a result, a film pressure distribution of a pressure (film pressure) of the lubricating film formed of the lubricating fluid formed on the bearing surface becomes a pressure distribution in which the film pressure is entirely distributed which is different from the conventional art having a high film pressure (peak pressure) at one place. In addition, the maximum film pressure in the film pressure distribution is also lowered in comparison with the conventional art. Accordingly, the fluid lubricating film in the area in which the film pressure is increased cannot be easily broken.

In addition, in the thrust bearing, at least one of others of the first spiral grooves of the first groove group and others of the second spiral grooves of the second groove group may be independently formed without communication with the spiral grooves of the other groove group. In particular, some of the spiral grooves of the groove group, which becomes a side, to which the lubricating fluid is drawn, may be independently formed. Since a portion of the lubricating fluid flowing along the spiral grooves is not in communication with the other groove group side, a higher film pressure is generated at a termination end (closed end) of the spiral groove. Accordingly, since a place at which the high film pressure is generated is formed at some of the spiral grooves of the groove group, which becomes a side to which the lubricating fluid is drawn, the film pressure distribution becomes a pressure distribution which is entirely distributed.

In addition, in the thrust bearing, the number of first spiral grooves of the first groove group may be different from the number of second spiral grooves of the second groove group. The partial communication section can be easily formed between some of the first spiral grooves of the first groove group and some of the second spiral grooves of the second groove group, and design of the groove section becomes easy.

Effects of the Invention

According to the thrust bearing of the present invention, in the pressure distribution in which the pressure (film pressure) of the lubricating film formed of the lubricating fluid is entirely distributed, the maximum film pressure in the pressure distribution is also lower than that of the conventional art. As a result, it is possible to make it difficult to break the fluid lubricating film while maintaining the same bearing loading capability as the thrust bearing having the conventional spiral groove. Accordingly, it is possible to obtain a bearing that can be used even when a higher bearing load is applied. In addition, it is possible to obtain a bearing capable of sufficiently dealing with a sudden action of a load due to a disturbance or the like.

EMBODIMENTS OF THE INVENTION

Figure 1:
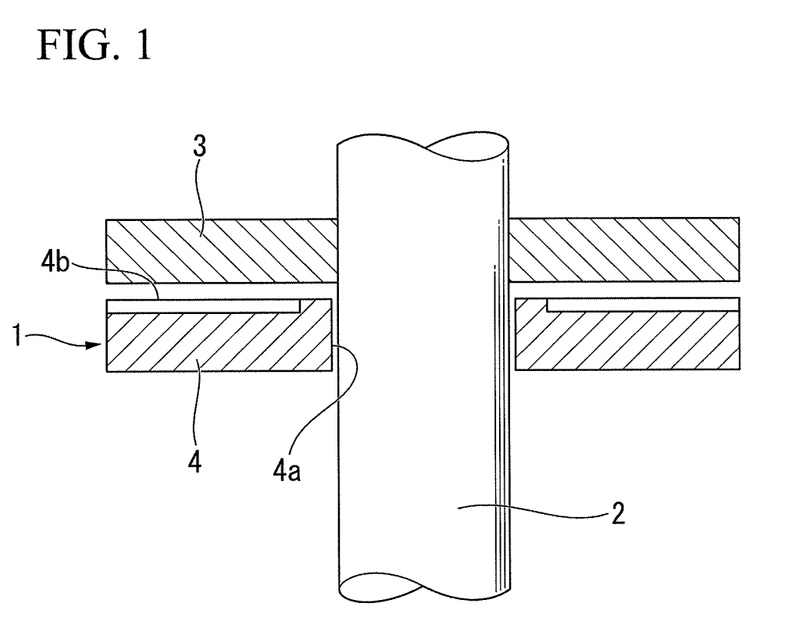
FIG. 1 is a side cross-sectional view showing an embodiment of a thrust bearing according to the present invention.
Figure 2:
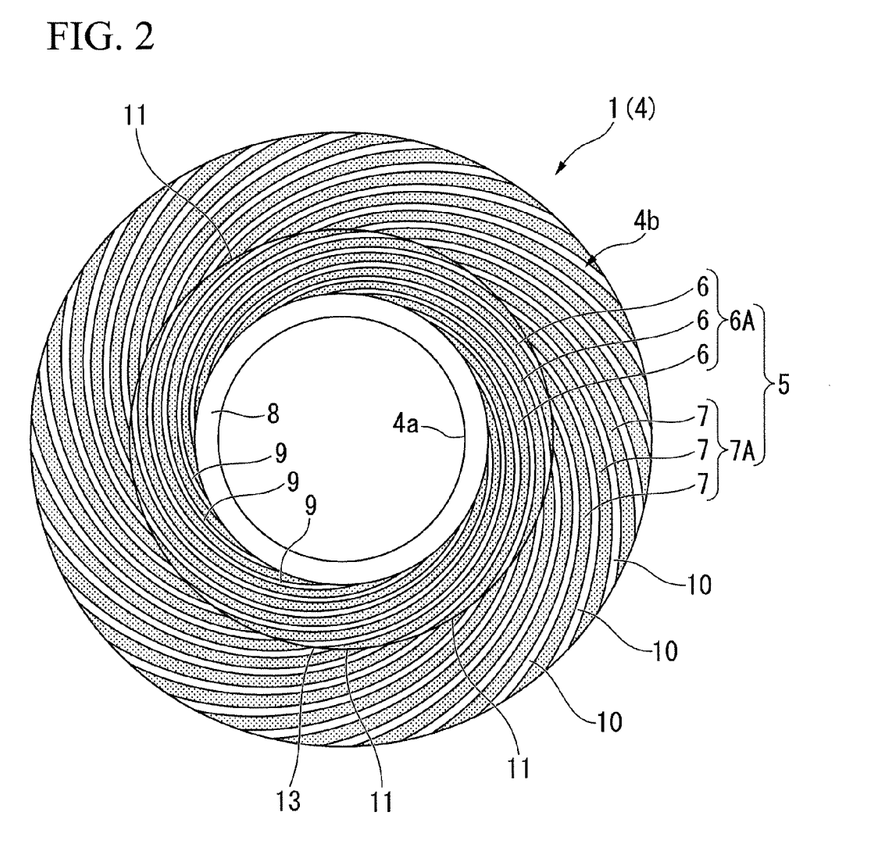
FIG. 2 is a plan view of a bearing surface of the thrust bearing shown in FIG. 1.

Hereinafter, a thrust bearing of the present invention will be described in detail with reference to the accompanying drawings. In the corresponding drawings used for the following description, the scales of the members are appropriately changed so that the members have recognizable sizes. FIG. 1 is a side cross-sectional view showing an embodiment of a thrust bearing of the present invention. FIG. 2 is a plan view of a bearing surface of the thrust bearing shown in FIG. 1. In FIGS. 1 and 2, reference numeral 1 is a thrust bearing. As shown in FIG. 1, the thrust bearing 1 is externally inserted and disposed to a rotary shaft 2 of, for example, a turbo charger or a turbo compressor.

The thrust bearing 1 is formed in an annular shape, and disposed to oppose an annular-shaped (disc-shaped) thrust collar 3 fixed to the rotary shaft 2. While FIG. 1 shows the thrust bearing 1 disposed at only one side of the thrust collar 3, the thrust bearings 1 having the same configuration may be installed at both sides of the thrust collar 3.

The thrust bearing 1 is formed of a bearing plate 4 disposed opposite to the thrust collar 3. The bearing plate 4 is formed in an annular shape, and has a through-hole 4a through which the rotary shaft 2 is inserted. A surface of the bearing plate 4 opposite to the thrust collar 3 is set to a bearing surface 4b. A groove section 5 shown in FIG. 2 is formed in the bearing surface 4b.

The groove section 5 includes a first groove group 6A constituted by a plurality of first spiral grooves 6 formed in an inner circumferential side of the bearing surface 4b, and a second groove group 7A constituted by a plurality of second spiral grooves 7 formed in an outer circumferential side of the bearing surface 4b more than the first groove group 6A. The first spiral grooves 6 and the second spiral grooves 7 are formed to be wound in the same direction. That is, in the embodiment, both of the first spiral grooves 6 and the second spiral grooves 7 are formed to lead from the outer circumferential side to the inner circumferential side of the bearing surface 4b and to be wound in a spiral shape in a rotation direction of the thrust collar 3.

Both of the first spiral grooves 6 and the second spiral grooves 7 draw a lubricating fluid from the outer circumferential side of the bearing surface 4b by rotation of the thrust collar 3 accompanied with rotation of the rotary shaft 2, and introduce (draw) the drawn lubricating fluid to the inner circumferential side along the spiral grooves 6 (7). That is, both of the first spiral grooves 6 and the second spiral grooves 7 are configured to function as spiral grooves of the pump-in type.

An annular land section 8 is disposed around the through-hole 4a, similar to the case of the spiral groove of the conventional pump-in type, at a further inner circumferential side of the first groove group 6A formed of the first spiral grooves 6 formed at the inner circumferential side, i.e., a side at which the lubricating fluid is drawn. That is, the first spiral grooves 6 extend from a substantially center portion in a radial direction of the bearing surface 4b to the land section 8. The land section 8 has an outer surface disposed at a relatively high position (disposed at the outside) with respect to a bottom surface of the first spiral groove 6.

Sections between the first spiral grooves 6 and the first spiral grooves 6 adjacent thereto also become spiral land sections (first lands 9), and similarly, sections between the second spiral grooves 7 and the second spiral grooves 7 adjacent thereto also become spiral land sections (second lands 10). All of the land section 8, the first lands (the land sections) 9, and the second lands (the land sections) 10 are formed to have the same height. That is, all lands are configured such that the outermost surfaces are disposed on the same surface.

Figure 3:
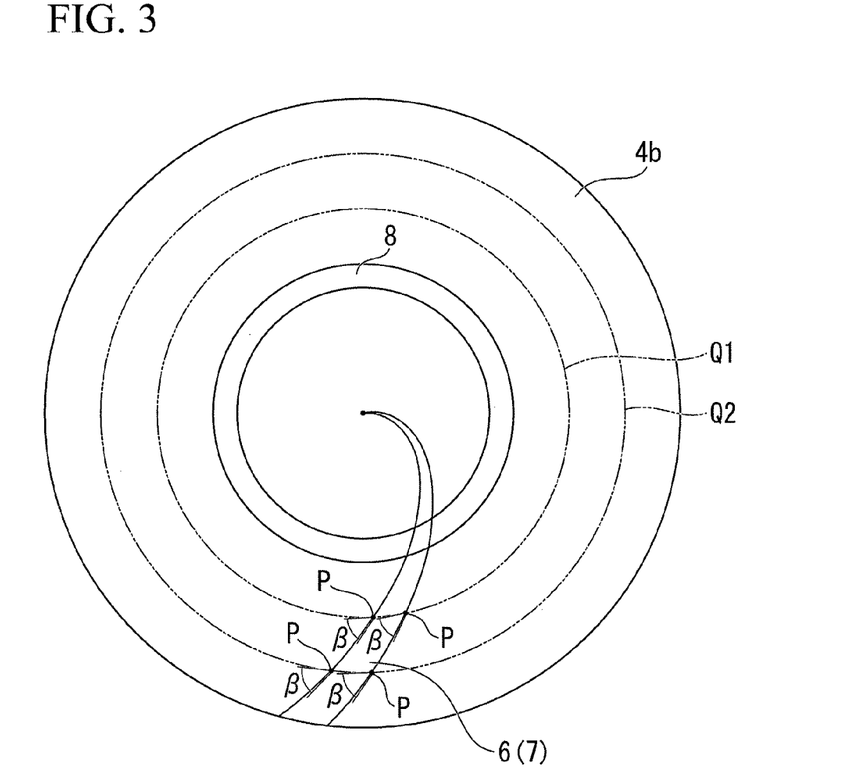
FIG. 3 is a schematic view for describing an inflow angle of a spiral groove.

All of the first spiral grooves 6 have the same inflow angle and are formed at the same pitch. Similarly, all of the second spiral grooves 7 also have the same inflow angle and are formed at the same pitch. As shown by a schematic view of FIG. 3, when concentric circles Q1, Q2 ... are drawn about an axial center on the bearing surface 4b, the inflow angle of the spiral grooves 6 (7) is defined based on tangential lines of crossing points P between (sidewalls of) the spiral grooves 6 (7) and the concentric circles Q1 and Q2. That is, the inflow angle of the spiral grooves 6 (7) is defined by an angle β formed between a tangential line of the sidewalls (a contour line) of the spiral grooves 6 (7) and a tangential line of the concentric circle Q1 (Q2). The inflow angle β becomes constant at the entire position of the sidewalls in the same spiral groove 6 (7). In other words, the spiral groove 6 (7) becomes a groove in which the inflow angle β becomes constant at the entire position of the sidewalls.

In the embodiment shown in FIG. 2, the inflow angle β of the first spiral grooves 6 is set to 8.5 degrees, and the inflow angle β of the second spiral grooves 6 is set to 17 degrees. In addition, the number of the first spiral grooves 6 of the first groove group 6A is set to 12, and the number of the second spiral grooves 7 of the second groove group 7A is set to 24. Accordingly, the first spiral grooves 6 and the second spiral grooves 7 have different pitches. That is, the first lands 9 formed between the first spiral grooves 6 and the first spiral grooves 6 adjacent thereto and the second lands 10 formed between the second spiral grooves 7 and the second spiral grooves 7 adjacent thereto are disposed to have deviated phases (see FIG. 4B).

In the groove section 5, at least one side of some of the first spiral grooves 6 of the first groove group 6A and some of the second spiral grooves 7 of the second groove group 7A is formed to be continued via partial communication sections 11 in partial communication with the other sides.

Figure 4A:
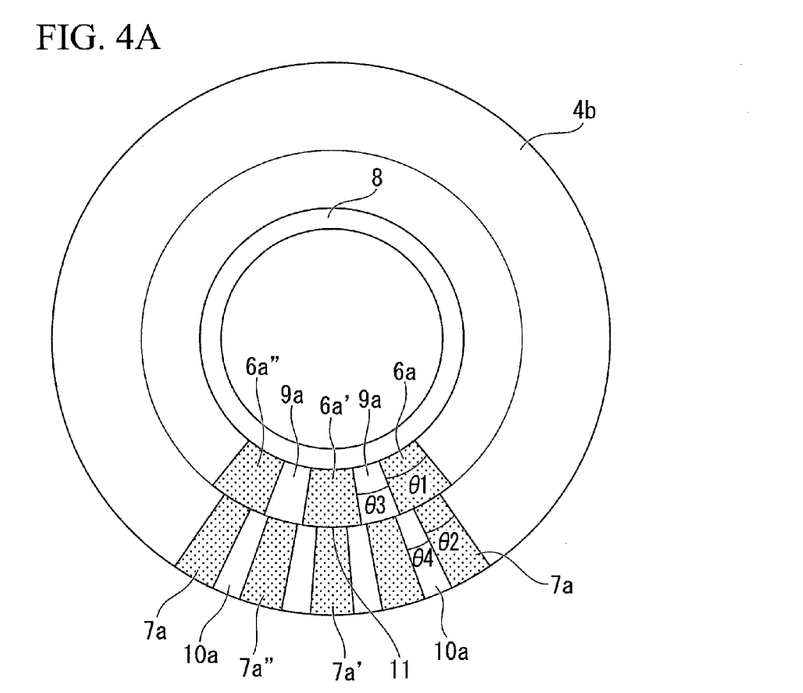
FIG. 4A is a view schematically showing a groove section in the bearing surface, which is not wound in a spiral shape.

FIG. 4A is a view schematically showing the groove section 5 in the bearing surface 4b. In the schematic view, for the purpose of simple illustration and easy understanding, the first spiral grooves 6 and the second spiral grooves 7 are shown as grooves 6a and 7a simply disposed in a radial shape, which are not wound in a spiral shape. As shown in FIG. 4A, the grooves 6a corresponding to the first spiral grooves 6 have a fan shape, both walls of which extend to a center of the bearing surface 4b and are formed, and a central angle θ1 thereof is 18 degrees. In addition, lands 9a (corresponding to the first lands 9) disposed between the grooves 6a and the groove 6a adjacent thereto also have a fan shape, both walls of which extend toward the center of the bearing surface 4b and are formed, and a central angle θ3 thereof obtained in the same manner as that of the grooves 6a is 12 degrees.

The grooves 7a corresponding to the second spiral grooves 7 have a fan shape, both walls of which extend toward the center of the bearing surface 4b and are formed, and a central angle θ2 thereof obtained in the same manner as that of the grooves 6a is 9 degrees. In addition, lands 10a (corresponding to the second lands 10) disposed between the grooves 7a and the groove 7a adjacent thereto have a fan shape, both walls of which extend toward the center of the bearing surface 4b and are formed, and a central angle θ4 thereof obtained in the same manner as that of to the grooves 6a is 6 degrees. Accordingly, 12 grooves 6a (the first spiral grooves 6) and 12 lands 9a (the first lands 9) are formed, and 24 grooves 7a (the second spiral grooves 7) and 24 lands 10a (the second lands 10) are formed in the bearing surface 4b.

As described above, in some of the grooves 7a (the second spiral grooves 7) and the grooves 6a (the first spiral grooves 6), at least one sides continue via the partial communication sections 11 in partial communication with the other sides. Accordingly, in FIG. 4A, the entire width of a groove 7a' is in communication with only a portion of a width of a groove 6a'. That is, the groove 7a' is continued to the groove 6a' via only the partial communication section 11 corresponding to a width of the groove 7a'.

Figure 4B:
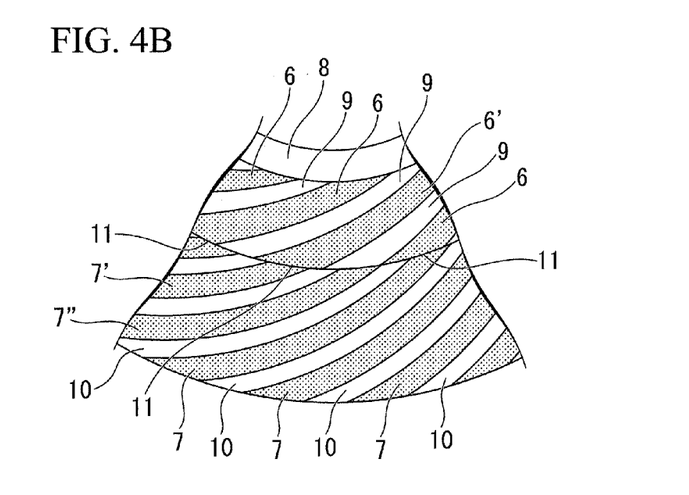
FIG. 4B is a view schematically showing major parts of the groove sections in the bearing surface.

In reality, the first spiral grooves 6 and the second spiral grooves 7 are wound in a spiral shape, and connecting places to each other are deviated. Accordingly, as shown in FIG. 4B, the first spiral grooves 6 and the second spiral grooves 7 continue via the partial communication sections 11 configured such that some of the first spiral grooves 6 and some of the second spiral grooves 7 are in communication with each other at some thereof, and not in communication with each other at some thereof. Some grooves 7a'' of the grooves 7a of the outer circumferential side in FIG. 4A are independently formed without communicating with grooves 6a'' of the inner circumferential side. As shown in FIG. 4B, the independent groove 7a" is present as an independent groove 7" even in reality.

Some of the first spiral grooves 6 of the first groove group 6A and some of the second spiral grooves 7 of the second groove group 7A are continued via the partial communication sections 11. Some of the partial communication sections 11, some of the first spiral grooves 6, and some of the second spiral grooves 7 are configured not to be in communication with each other. Accordingly, some of the lubricating fluid flowing along the second spiral grooves 7 of the outer circumferential side is temporarily blocked by the partial communication sections 11 (see FIG. 4B), and a high film pressure is generated at the partial communication sections 11. That is, while some of the second spiral grooves 7' of the outer circumferential side are in communication with the grooves 6' of the inner circumferential side, some of the second spiral grooves 7" of the outer circumferential side are not in communication with the grooves 6 of the inner circumferential side but independently formed. Accordingly, the lubricating fluid flowing along the spiral grooves 7" generates a higher film pressure at a termination end (closed end) of the spiral grooves 7".

In the thrust bearing 1 of the embodiment, when the rotary shaft 2 shown in FIG. 1 is rotated and the thrust collar 3 is rotated, the bearing surface 4b draws the lubricating fluid from the outer circumferential side to the inner circumferential side along the second spiral grooves 7. As a result, the fluid lubricating film formed of the lubricating fluid is formed between the thrust collar 3 and the bearing surface 4b. Here, as described above, while some of the first spiral grooves 6 (6') are in communication with some of the second spiral grooves 7 (7') via the partial communication sections 11, others of the second spiral grooves 7 (7") are not in communication with the grooves 6 of the inner circumferential side but independently formed. Accordingly, the fluid lubricating film generates a higher film pressure at the termination end (closed end) of the spiral grooves 7 (7").

The partial communication sections 11 are formed at a boundary section 13 between some of the first groove group 6A and some of the second groove group 7A, and still others of the second spiral grooves 7 (7") are formed in an independent state. For this reason, a high film pressure is generated around the boundary section 13. In addition, in FIG. 2, while the boundary section 13 is shown by a solid line for the purpose of easy understanding, in reality, a boundary line is not present between the first groove group 6A and the second groove group 7A.

The lubricating fluid passing through the second spiral grooves 7 passes through the first spiral grooves 6 of inner circumferential side, and arrives at the land section 8 formed at the inner circumferential side, to which the lubricating fluid is drawn. Accordingly, the high film pressure is also generated at this place. A branch flow separated from a main flow along some of the second spiral grooves 7 (7') or others of the second spiral grooves 7 (7") becomes a flow in a circumferential direction, and runs on the second land 10 and the first land 9 to generate a film pressure. In addition, the branch flow is smaller in quantity than the main flow.

Figure 5:
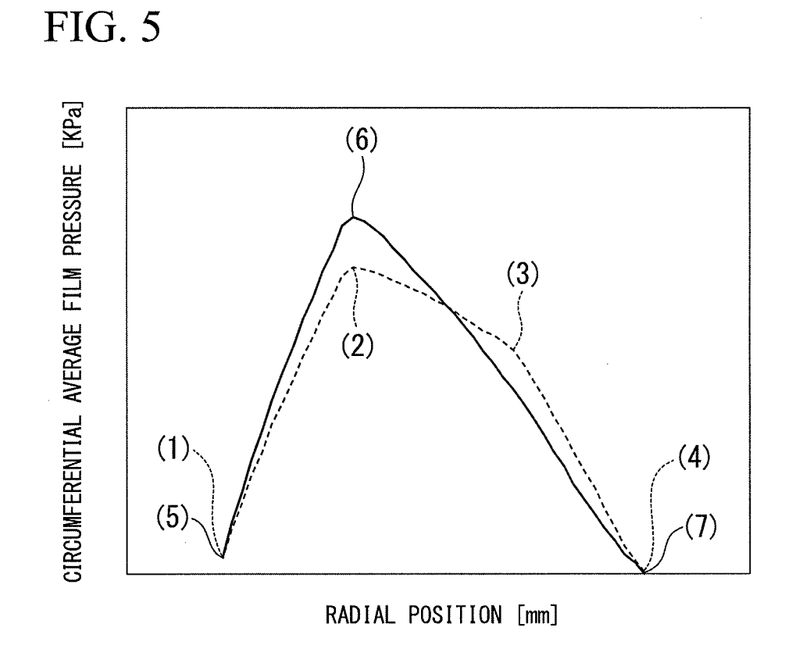
FIG. 5 is a graph showing distribution of a pressure (a film pressure) of a fluid lubricating film.

In the thrust bearing 1 of the embodiment, the film pressure distribution of the pressure (film pressure) of the lubricating film formed of the lubricating fluid formed on the bearing surface 4b becomes a pressure distribution in which the film pressure is entirely distributed. FIG. 5 is a graph showing a distribution of the pressure (film pressure) of the fluid lubricating film. A horizontal axis in the graph of FIG. 5 represents a distance (a position in a radial direction) in a radial direction from a center of the bearing surface (away from the center as it goes rightward). A vertical axis in the graph of FIG. 5 represents an average pressure (circumferential average film pressure) of the fluid lubricating film (increased as it goes upward).

Figure 6:
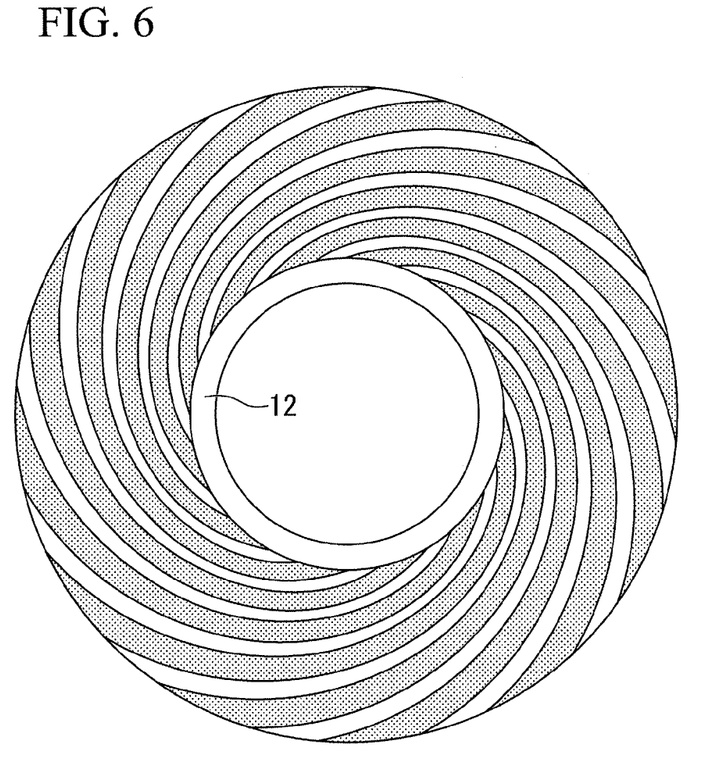
FIG. 6 is a plan view of a bearing surface having a conventional pump-in type spiral groove of the related art.

The broken line in the graph of FIG. 5 represents the pressure (film pressure) distribution of the fluid lubricating film of the thrust bearing 1 having the bearing surface 4b shown in FIG. 2. The solid line in the graph of FIG. 5 represents a pressure (film pressure) distribution of a fluid lubricating film of a thrust bearing having a bearing surface, in which a conventional pump-in type spiral groove shown in FIG. 6 is formed, for the purpose of comparison.

The broken line (1) in the graph of FIG. 5 represents a pressure of the land 8 at the inner circumferential edge of FIG. 2, and the broken line (2) represents a pressure of the land 8 at the outer circumferential edge. In addition, the broken line (3) represents a pressure at the boundary section between the first groove group 6A and the second groove group 7A, and the broken line (4) represents a pressure at the outer circumferential edge of the bearing surface 4b. The solid line (5) in the graph of FIG. 5 represents a pressure of a land 12 in FIG. 6 at the inner circumferential edge, and similarly the solid line (6) represents a pressure of the land 12 at the outer circumferential edge. In addition, the solid line (7) represents a pressure of the bearing surface at the outer circumferential edge.

As shown by the solid line in FIG. 5, in the thrust bearing having the conventional pump-in type spiral groove of the related art, within a range from the outer circumferential edge (7) of the bearing surface to the outer circumferential edge (6) of the land 12, the pressure (film pressure) of the fluid lubricating film is varied to be continuously increased from the outer circumferential side to the inner circumferential side of the bearing surface. In addition, even when viewing the entire bearing surface, the pressure (film pressure) of the fluid lubricating film is maximally increased at the outer circumferential edge (6) of the land 12, i.e., the inner circumferential end of the region in which the spiral groove is formed. Accordingly, in the related art, a peak of the film pressure is formed around the closing end of the groove, which becomes the outer circumferential edge (6) of the land 12.

However, as described above, since the theoretical peak pressure cannot be obtained in the peak pressure generating area, in the related art, the fluid lubricating film is likely to be broken in the area. On the other hand, as shown by the broken line in FIG. 5, in the thrust bearing 1 of the embodiment, within a range from the boundary section (3) between the first groove group 6A and the second groove group 7A to the outer circumferential edge (2) of the land 8, the pressure (film pressure) of the fluid lubricating film is a relatively high pressure, and the pressure distribution of the film pressure is entirely distributed. In addition, the peak pressure (the maximum film pressure) of the film pressure in the pressure distribution is also decreased in comparison with the related art.

According to the thrust bearing 1 of the embodiment, unlike the pressure distribution of the film pressure of the related art, which has a high film pressure (peak pressure) at one place, the pressure distribution of the film pressure of the embodiment becomes the pressure distribution in which a relatively low peak pressure is distributed in a wide range. Accordingly, the fluid lubricating film cannot be easily broken while maintaining the same bearing loading capability as of the thrust bearing in which the conventional spiral groove is formed. For this reason, it is possible to obtain the bearing that can be used without the burning even when a higher bearing load is applied. In addition, it is possible to obtain the bearing that can sufficiently deal with an action of a sudden load due to the disturbance or the like.

In the thrust bearing 1, the number of first spiral grooves 6 of the first groove group 6A is different from the number of second spiral grooves 7 of the second groove group 7A. Accordingly, formation of the partial communication section 11 becomes easy, and design of the groove groups 6A and 7A becomes easy.

In the embodiment, as described using the schematic view of FIG. 4A, as the number of first spiral grooves 6 of the first groove group 6A is different from the number of second spiral grooves 7 of the second groove group 7A and further the inflow angle β of the first spiral grooves 6 is different from the inflow angle β of the second spiral grooves 7 of the second groove group 7A, the partial communication section 11 is formed. Further, the independent second spiral grooves 7 not in communication with the first spiral grooves 6 are formed. However, the present invention is not limited thereto but, for example, the partial communication section 11 configured to generate the high film pressure can be formed by varying the groove width and varying the depth of the groove between the first spiral grooves 6 and the second spiral grooves 7.

For example, while the number of first spiral grooves 6 is equal to the number of second spiral grooves 7, the partial communication section 11 may be formed by varying the phases thereof to alternately dispose the first spiral grooves 6 and the second spiral grooves 7 in a circumferential direction in a zigzag shape. Further, the partial communication section 11 may be formed by varying a width ratio between the spiral grooves 6 and 7, the first land 9, and the second land 10. Of course, as the number, the groove width, the phase, and further the inflow angle β or the width ratio between the groove and the land of the first spiral grooves 6 and the second spiral grooves 7 are assembled and varied in multiple combinations, the partial communication sections 11 may be formed, and the spiral grooves independent from some of the groove group, which becomes the side that draws the lubricating fluid, may be formed. The first spiral grooves 6 and the second spiral grooves 7 require that patterns have certain regularity in the circumferential direction for a function of the bearing.

In the embodiment, while both of the first spiral grooves 6 and the second spiral grooves 7 are also the pump-in type, the present invention is not limited thereto but, for example, both of the first spiral grooves and the second spiral grooves may be the pump-out type. In this case, an annular land section is formed at the outer circumferential side that becomes the side to which the fluid is drawn.

The present invention can be applied to a conventional herringbone in which the pump-in type spiral grooves and the pump-out type spiral grooves are formed. Specifically, in the conventional herringbone, the pump-in type spiral groove section may be replaced with a structure constituted by the first spiral grooves 6 and the second spiral grooves 7 of the present invention. Similarly, the pump-out type spiral grooves in the herringbone may be replaced with a structure constituted by the first spiral grooves and the second spiral grooves of the present invention. Further, both of the pump-in type spiral grooves and pump-out type spiral grooves in the herringbone may be replaced with a structure constituted by the first spiral grooves and the second spiral grooves of the present invention. Even in the herringbone type thrust bearing constituted by the structure, the fluid lubricating film cannot be easily broken in comparison with the conventional art.

In the embodiment, while the groove section is constituted by the first groove group and the second groove group, the present invention is not limited thereto but the groove section may be constituted by three or more groove groups. In the embodiment, a boundary between the first spiral grooves of the first groove group and the second spiral grooves of the second groove group is defined on a substantially central portion in the radial direction of the bearing surface, i.e., a concentric circle disposed on the substantially central portion. The boundary between the first spiral grooves and the second spiral grooves may not be entirely on the concentric circle disposed on the substantially central portion. The boundary may be disposed to be distributed on a plurality of concentric circles.

INDUSTRIAL APPLICABILITY

According to the thrust bearing of the present invention, the pressure (film pressure) of the lubricating film formed of the lubricating fluid becomes the pressure distribution which is entirely distributed, and the maximum film pressure in the pressure distribution is also decreased in comparison with the conventional art. As a result, the fluid lubricating film cannot be easily broken while maintaining the same bearing loading capability as the thrust bearing in which the conventional spiral grooves are formed. Accordingly, it is possible to obtain the bearing that can be used even when a higher bearing load is applied. In addition, it is possible to obtain the bearing that can sufficiently deal with a sudden action of the load due to a disturbance or the like.

BRIEF DESCRIPTION OF THE REFERENCE SYMBOLS

1: thrust bearing, 2: rotary shaft, 3: thrust collar, 4: bearing plate, 4b: bearing surface, 5: groove section, 6: first spiral groove, 6A: first groove group, 6a, 6a', 6a": groove, 7: second spiral groove, 7A: second groove group, 7a, 7a', 7a": groove, 8: land section, 9: first land, 10: second land, 11: partial communication section

The invention claimed is:
1. A thrust bearing disposed to oppose a thrust collar installed at a rotary shaft, comprising:
   a groove section formed at a bearing surface disposed to oppose the thrust collar;
   a first groove group constituted by a plurality of first spiral grooves formed at an inner circumferential side of the bearing surface;
   a second groove group formed at an outer circumferential side of the bearing surface more than the first groove group and constituted by a plurality of second spiral grooves wound in the same direction as the first spiral grooves, and the groove section having the first groove group and the second group; and
   an annular land section formed at a portion where a fluid is drawn located either at an inner circumferential side of the first groove group or an outer circumferential side of the second groove group,
   wherein at least part of the first spiral grooves of the first groove group and part of the second spiral grooves of the second groove group are in communication with each other via part of a partial communication section, and
   the number of the second spiral grooves of the second groove group is equal to or more than the number of the first spiral grooves of the first groove group.
2. The thrust bearing according to claim 1, wherein at least part of the remainder of the first spiral grooves of the first groove group and part of the remainder of the second spiral grooves of the second groove group are independently formed without communication with each other.

3. The thrust bearing according to claim 1, wherein the number of first spiral grooves of the first groove group is different from the number of second spiral grooves of the second groove group.

4. The thrust bearing according to claim 2, wherein the number of first spiral grooves of the first groove group is different from the number of second spiral grooves of the second groove group.

* * * * *